(12) United States Patent
Kominami et al.

(10) Patent No.: US 11,043,831 B2
(45) Date of Patent: Jun. 22, 2021

(54) CHARGING DEVICE AND ON BOARD POWER SUPPLY DEVICE

(71) Applicant: Panasonic Intellectual Property Management Co., Ltd., Osaka (JP)

(72) Inventors: Satoshi Kominami, Kanagawa (JP); Nobuaki Satoh, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 52 days.

(21) Appl. No.: 16/504,503

(22) Filed: Jul. 8, 2019

(65) Prior Publication Data

US 2019/0329663 A1 Oct. 31, 2019

Related U.S. Application Data

(63) Continuation of application No. PCT/JP2017/040868, filed on Nov. 14, 2017.

(30) Foreign Application Priority Data

Mar. 2, 2017 (JP) .............................. JP2017-039516

(51) Int. Cl.
*H02J 7/02* (2016.01)
*B60L 53/22* (2019.01)
*B60L 53/10* (2019.01)
*H02J 7/00* (2006.01)
*H02M 1/088* (2006.01)
*H02M 3/335* (2006.01)
*B60L 50/60* (2019.01)

(52) U.S. Cl.
CPC ................ *H02J 7/02* (2013.01); *B60L 50/60* (2019.02); *B60L 53/10* (2019.02); *B60L 53/22* (2019.02);
(Continued)

(58) Field of Classification Search
CPC ........................................................ B60L 53/22
(Continued)

(56) References Cited

U.S. PATENT DOCUMENTS

2011/0176343 A1 7/2011 Kojima
2013/0106365 A1* 5/2013 Ang ...................... H02J 7/022
320/138

(Continued)

FOREIGN PATENT DOCUMENTS

JP 11-355909 12/1999
JP 2005-237125 A 9/2005
(Continued)

OTHER PUBLICATIONS

International Search Report of PCT application No. PCT/JP2017/040868 dated Dec. 12, 2017.
(Continued)

*Primary Examiner* — Edward Tso
*Assistant Examiner* — Ahmed H Omar
(74) *Attorney, Agent, or Firm* — Seed IP Law Group LLP

(57) ABSTRACT

A charging device includes an AC/DC converter, a first DC/DC converter, a second DC/DC converter, and an inductance element. The AC/DC converter is connected to an external power source and configured to convert AC power into DC power. The first DC/DC converter is configured to convert a voltage the DC power outputted from the AC/DC converter and supply the resultant DC power to a first battery. The second DC/DC converter is connected in parallel to the first battery on the output side of the first DC/DC converter, and configured to convert a voltage of the DC power outputted from the first DC/DC converter and supply the resultant DC power to a second battery. The inductance element is provided between the first DC/DC converter and the second DC/DC converter, and connected in series to the first DC/DC converter and the second DC/DC converter.

19 Claims, 2 Drawing Sheets

(52) U.S. Cl.
CPC ............ *H02J 7/0013* (2013.01); *H02J 7/022*
(2013.01); *H02M 1/088* (2013.01); ***H02M
3/33523*** (2013.01); *B60L 2210/10* (2013.01);
*B60L 2210/30* (2013.01)

(58) Field of Classification Search
USPC ........................................................ 320/140
See application file for complete search history.

(56) References Cited

U.S. PATENT DOCUMENTS

2016/0141951 A1* 5/2016 Mao ..................... H02M 1/36
363/21.02
2018/0241306 A1 8/2018 Takahashi et al.

FOREIGN PATENT DOCUMENTS

| | | |
|---|---|---|
| JP | 2011-062018 | 3/2011 |
| WO | 2010/035338 | 4/2010 |
| WO | 2012/011176 | 1/2012 |
| WO | 2017/022477 | 2/2017 |

OTHER PUBLICATIONS

Japanese Notice of Reasons for Refusal dated Apr. 27, 2021 for the related Japanese Patent Application No. 2017-039516, 6 pages (with English Translation).

* cited by examiner ized Publication No. 2011-062018).

CHARGING DEVICE AND ON BOARD POWER SUPPLY DEVICE

CROSS-REFERENCE TO RELATED APPLICATIONS

This application is a continuation of the PCT International Application No. PCT/JP2017/040868 filed on Nov. 14, 2017, which claims the benefit of foreign priority of Japanese patent application No. 2017-039516 filed on Mar. 2, 2017, the contents all of which are incorporated herein by reference.

BACKGROUND

1. Technical Field

The present disclosure relates to a charging device and an on board power supply device.

2. Description of the Related Art

Recent hybrid cars, electric vehicles, and other various electromotive apparatuses are equipped with a high voltage battery serving as a power source of a high voltage system, a low voltage battery serving as a power source of a low voltage system, and a charging device configured to charge these batteries.

As such a charging device, there are known a charging device including: a charging circuit configured to convert alternating current (AC) power supplied from an external power source into direct current (DC) power; and a DC/DC converter configured to convert an output voltage of the charging circuit (for example, see Japanese Patent Unexamined Publication No. 2011-062018).

SUMMARY

The charging device according to the present disclosure is configured to charge a first battery and is capable of a second battery having a charge voltage different from that of the first battery using AC power supplied from an external power source. This charging device includes an AC/DC converter, a first DC/DC converter, a second DC/DC converter, and an inductance element. The AC/DC converter is connected to the external power source and configured to convert AC power into first DC power. The first DC/DC converter is configured to convert a voltage of the first DC power outputted from the AC/DC converter to generate second DC power and supply the second DC power to the first battery. The second DC/DC converter is connected in parallel to the first battery on the output side of the first DC/DC converter, and configured to convert a voltage of the second DC power outputted from the first DC/DC converter to generate third DC power and supply the third DC power to the second battery. The inductance element is provided between the first DC/DC converter and the second DC/DC converter and connected in series to the first DC/DC converter and the second DC/DC converter.

The on board power supply device according to the present disclosure includes: the above-described charging device; the first battery connected to the first DC/DC converter on the output side of the first DC/DC converter; and the second battery connected to the second DC/DC converter on an output side of the second DC/DC converter.

The charging device according to the present disclosure is capable of flexibly charging a high voltage battery and a low voltage battery, and is capable of reducing fluctuations of a charging current to be supplied to each of the high voltage battery and the low voltage battery.

DETAILED DESCRIPTION OF PREFERRED EMBODIMENTS

In a charging device, a charging current including fluctuations at the minimum is desirably supplied to a battery. When a charging current including many fluctuations is supplied to a battery, there is a possibility of the occurrence of an unsatisfactory charge state in this battery, such as variations in the cell voltages of a plurality of battery cells constituting the battery or the generation of unreacted ions due to insufficient chemical reactions inside the battery cells.

The present disclosure provides a charging device and an on board power supply device. The charging device is capable of flexibly charging a high voltage battery and a low voltage battery, and capable of supplying a charging current with few fluctuations to each of the high voltage battery and the low voltage battery.

Hereinafter, with reference to FIG. 1 and FIG. 2, a configuration example of a charging device according to an embodiment of the present disclosure will be described. Note that the charging device according to the present embodiment is installed in, for example, an electric vehicle, and constitutes an on board power supply device, together with a battery.

Figure 1:
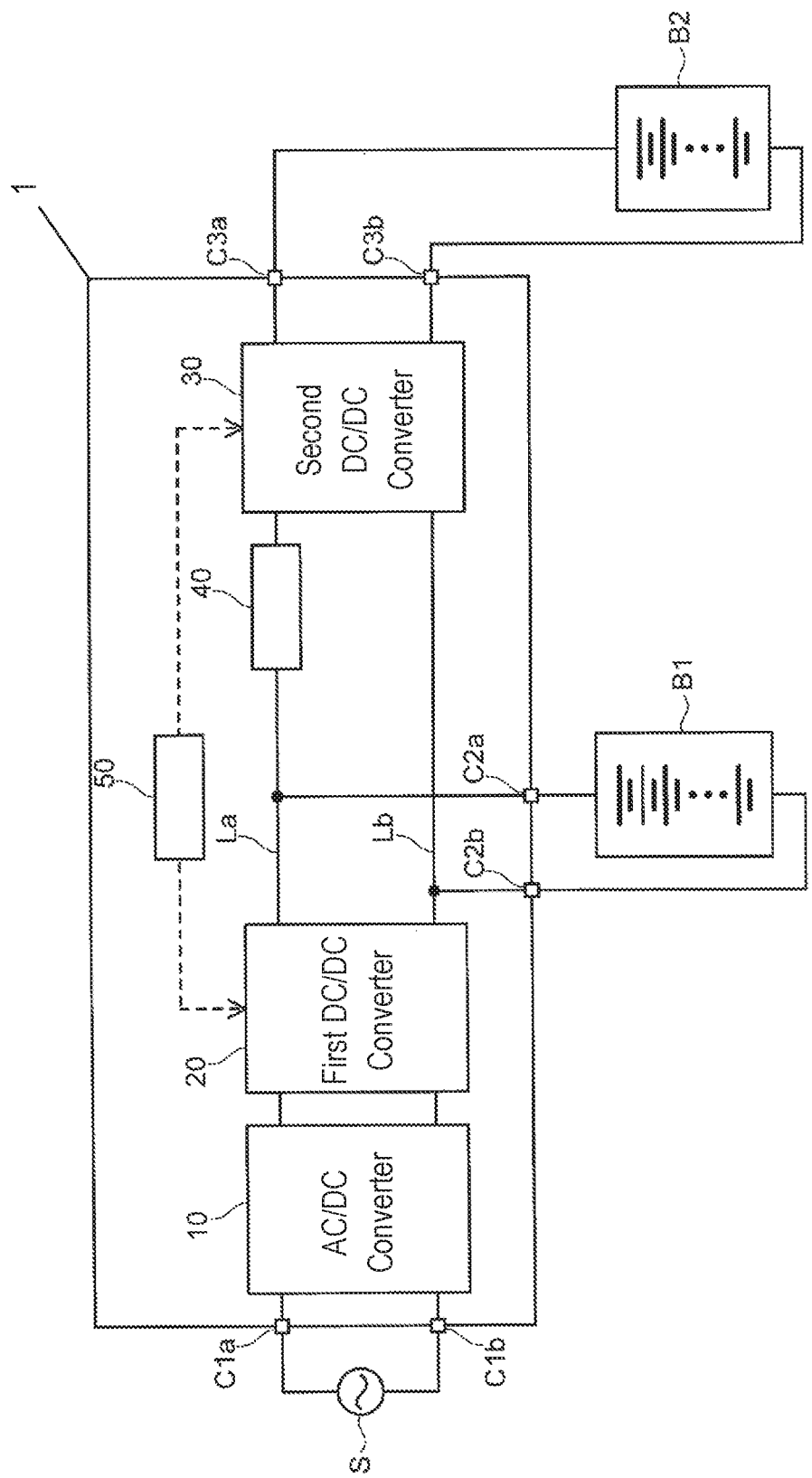
FIG. 1 is a diagram illustrating an overall configuration example of a charging device according to an embodiment.

FIG. 1 is a diagram illustrating an overall configuration example of charging device 1 according to the present embodiment. FIG. 2 is a diagram illustrating a circuit configuration example of charging device 1 according to the present embodiment In FIG. 1 and FIG. 2, high-side line La refers to a power line on the high side, and low-side line Lb refers to a power line on the low side. In FIG. 1 and FIG. 2, power lines for supplying electric power from high voltage battery B1 and low voltage battery B2 to electric loads, respectively, are not illustrated.

Charging device 1 is connected to external power source S, and configured to convert electric power supplied from external power source S and supply the converted electric power to high voltage battery B1 and low voltage battery B2. Note that charging device 1 is connected to external power source S via terminals C1a and C1b, connected to high voltage battery B1 via terminals C2a and C2b, and connected to low voltage battery B2 via terminals C3a and C3b.

Charging device 1 includes AC/DC converter 10, first DC/DC converter 20, second DC/DC converter 30, inductance element 40, and electronic control unit (ECU) 50.

To meet needs for size reduction of power modules, charging device 1 according to the present embodiment is configured such that AC/DC converter 10, first DC/DC converter 20, second DC/DC converter 30, and inductance element 40 are integrally housed in an identical casing.

External power source S is connected to charging device 1 via, for example, a connecting plug when charging high voltage battery B1. External power source S is a commercial power source which supplies, for example, single-phase AC power of 60 Hz and 200V, and supplies the AC power to AC/DC converter 10 on the input side of AC/DC converter 10.

High voltage battery B1 is a main battery configured to supply electric power to, for example, a drive motor. High voltage battery B1 is charged with DC power having a voltage higher than that of low voltage battery B2 (hereinafter, also referred to as a "charge voltage"), and is capable of outputting this DC power having the high voltage. As high voltage battery B1, for example, a lithium ion secondary battery of 48 V is employed.

In high voltage battery B1, a positive electrode is connected to high-side line La on the output side of first DC/DC converter 20, and a negative electrode is connected to low-side line Lb on the output side of first DC/DC converter 20, so that high voltage battery B1 can receive electric power from first DC/DC converter 20. Furthermore, high voltage battery B1 can supply electric power to low voltage battery B2 via high-side line La and low-side line Lb.

Low voltage battery B2 is an auxiliary battery configured to supply electric power to, for example, an auxiliary module of a low voltage system. Low voltage battery B2 is charged with DC power having a voltage lower than that of high voltage battery B1, and is capable of outputting this DC power having the lower voltage. As low voltage battery B2, for example, a lead storage battery of 12 V is employed.

In low voltage battery B2, a positive electrode is connected to high-side line La on the output side of second DC/DC converter 30, and a negative electrode is connected to low-side line Lb on the output side of second DC/DC converter 30, so that low voltage battery B2 can receive electric power from second DC/DC converters 30.

Hence, the DC power outputted from first DC/DC converter 20 is higher in voltage than the DC power outputted from second DC/DC converter 30.

AC/DC converter 10 is connected to external power source S, and configured to convert AC power into DC power and supply the DC power to first DC/DC converter 20. AC/DC converter 10 includes, for example, rectifying circuit 11 and smoothing capacitor 12. AC/DC converter 10 may further include for example, a power correction circuit on the output side of AC/DC converter 10.

First DC/DC converter 20 is connected to AC/DC converter 10 on the output side of AC/DC converter 10, and configured to convert a voltage of the DC power and supply the DC power having the converted voltage to high voltage battery B1. As first DC/DC converter 20, a DC/DC converter with a switching regulation type, more preferably an LLC resonant converter circuit is employed.

Figure 2:
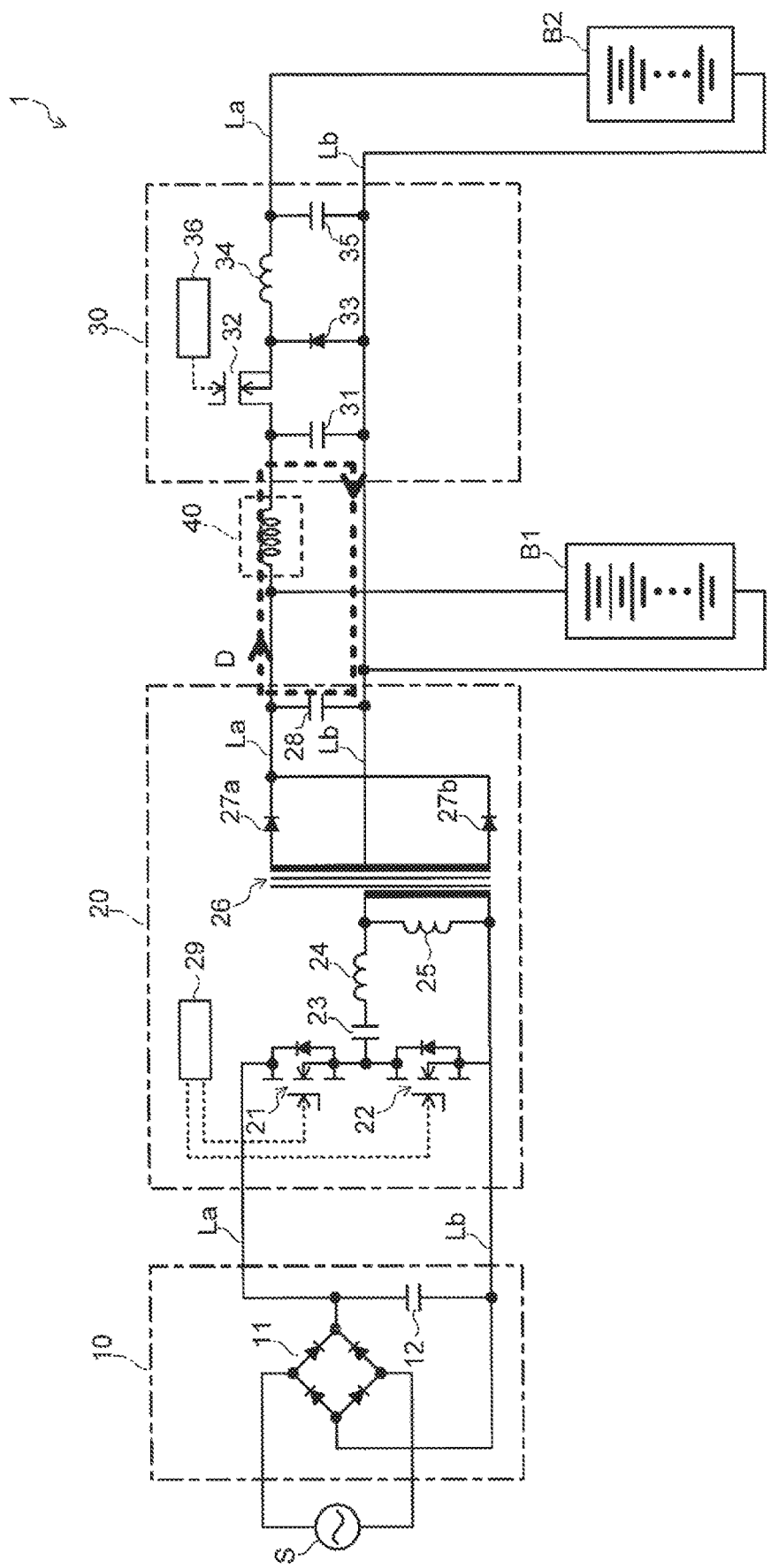
FIG. 2 is a diagram illustrating a circuit configuration example of the charging device according to the embodiment.

FIG. 2 illustrates a circuit configuration example in which an LLC resonant converter circuit (hereinafter, also referred to as "LLC resonant converter circuit 20") is applied as first DC/DC converter 20.

LLC resonant converter circuit 20 includes transformer 26 having a primary coil and a secondary coil. In LLC resonant converter circuit 20, high-side switch 21 and low-side switch 22 (corresponding to "switching driver" of the present disclosure) are provided on the primary side of transformer 26, and constitute a half bridge circuit. Furthermore, in LLC resonant converter circuit 20, resonant capacitor 23 and resonant inductor 24 are provided on the output side of the half bridge circuit, and constitute a series resonant circuit. Note that inductor 25 connected in parallel to the primary coil of transformer 26 is an exciting reactor generated in transformer 26.

LLC resonant converter circuit 20 further includes diodes 27a and 27b and smoothing capacitor 28 on the secondary side of transformer 26 to constitute a rectifying circuit.

Furthermore, LLC resonant converter circuit 20 includes control circuit 29 configured to generate a switching signal. Using a switching signal outputted from control circuit 29, LLC resonant converter circuit 20 performs ON-OFF control over high-side switch 21 and low-side switch 22 by turns, and thereby converts inputted DC power to have a predetermined voltage, and outputs the DC power having the predetermined voltage.

Second DC/DC converter 30 is connected to first DC/DC converter 20 on the output side of first DC/DC converter 20, and configured to convert (here, to step down) a voltage of DC power, and supply the DC power having the converted voltage to low voltage battery B2. Second DC/DC converter 30 is connected in parallel to high voltage battery B1 on the output side of first DC/DC converter 20. As second DC/DC converter 30, a DC/DC converter with a switching regulation type, more preferably a step-down chopper circuit is employed.

FIG. 2 illustrates the circuit configuration example in which a step-down chopper circuit (hereinafter, also referred to as "step-down chopper circuit 30") is applied as second DC/DC converter 30.

Step-down chopper circuit 30 includes, for example, input-side smoothing capacitor 31, switch element 32, free wheel diode 33, reactor 34, and output-side smoothing capacitor 35.

Input-side smoothing capacitor 31 is connected between high-side line La and low-side line Lb, and configured to smooth a voltage of DC power inputted from the output side of first DC/DC converter 20. Switch element 32 (corresponding to "switching driver" of the present disclosure) is connected in series with the input side and the output side of high-side line La therebetween, and configured to control a current flowing downstream.

Reactor 34 is connected in series to switch element 32 downstream of switch element 32 on high-side line La, and configured to store and discharge electromagnetic energy in accordance with a current to be supplied. Free wheel diode 33 is connected, downstream of switch element 32 and upstream of reactor 34, to high-side line La and low-side line Lb therebetween, and configured to inhibit a current from flowing as long as switch element 32 is on, and to pass a current in the direction of discharging electromagnetic energy stored in reactor 34, as long as switch element 32 is off. Output-side smoothing capacitor 35 is connected between high-side line La and low-side line Lb, and configured to smooth a voltage of electric power inputted from reactor 34.

Second DC/DC converter 30 further includes control circuit 36 configured to generate a switching signal. Using a switching signal outputted from control circuit 36, second DC/DC converter 30 performs ON-OFF control over switch element 32, and thereby converts inputted DC power to have a predetermined voltage and outputs the DC power having the predetermined voltage.

Inductance element 40 is connected in series with first DC/DC converter 20 and second DC/DC converter 30 therebetween, and configured to reduce fluctuations of a current flowing between first DC/DC converter 20 and second DC/DC converter 30, and thereby prevent a resonant current from generating.

Inductance element 40 according to the present embodiment is connected to high-side line La downstream of a branch point to high voltage battery B1, on high-side line La on the output side of first DC/DC converter 20. In order to achieve the above-described functions, for example, inductance element 40 preferably has an inductance value at least 10 times as high as that of a parasitic inductance of power line La. Note that the provision of inductance element 40 downstream of the branch point to high voltage battery B1 makes it possible to reduce losses in the charging of high voltage battery B1.

A charge operation of charging device 1 according to the present embodiment is controlled by, for example, ECU 50. ECU 50 monitors, for example, the states of charge of high voltage battery B1 and low voltage battery B2, and determines their respective operation modes, based on the states of charge. Then, for example, ECU 50 orders control circuit 29 of first DC/DC converter 20 and control circuit 36 of second DC/DC converter 30 to perform operations in their respective operation modes.

ECU 50 allows charging high voltage battery B1 and low voltage battery B2, for example, by constant current-constant voltage (CCCV) charge. At this time, for example, control circuit 29 of first DC/DC converter 20 and control circuit 36 of second DC/DC converter 30 perform switching control through feedback control based on a detection signal from a voltage sensor or a current sensor (not illustrated) provided in power line La or Lb, so as to achieve a constant current or a constant voltage.

Charging device 1 according to the present embodiment makes it possible to, by operation control of first DC/DC converter 20, flexibly adjust a voltage of electric power to be supplied to high voltage battery B1, and also makes it possible to, by operation control of second DC/DC converter 30, flexibly adjust a voltage of electric power to be supplied to low voltage battery B2. Furthermore, charging device 1 according to the present embodiment allows high voltage battery B1 to charge low voltage battery B2 via second DC/DC converter 30.

However, charging device 1 according to the present embodiment is configured such that second DC/DC converter 30 is connected to first DC/DC converter 20 on the output side of first DC/DC converter 20, and accordingly, there is a possibility that, when first DC/DC converter 20 and second DC/DC converter 30 simultaneously perform switching operation, a current flowing between these DC/DC converters may fluctuate, whereby a resonant condition may be caused.

A resonant current generated between first DC/DC converter 20 and second DC/DC converter 30 is now described with reference to FIG. 2.

Bold dotted line D in FIG. 2 indicates an example of a resonant current flowing in the case where inductance element 40 is not provided.

Charging device 1 sometimes causes first DC/DC converter 20 and second DC/DC converter 30 to simultaneously perform switching operation in order to simultaneously charge high voltage battery B1 and low voltage battery B2. In this case, a current fluctuates between first DC/DC converter 20 and second DC/DC converter 30.

At this time, if the frequency of the fluctuating current includes the resonance frequency of a closed circuit between first DC/DC converter 20 and second DC/DC converter 30, a resonant current of greater amplitude occurs. In FIG. 2, smoothing capacitor 28, high-side line La, input-side smoothing capacitor 31, and low-side line Lb constitute this closed circuit. As a result, when this resonant current, for example, flows into high voltage battery B1, it is difficult to keep a charging current to high voltage battery B1 constant.

In particular, in charging device 1 according to the present embodiment, first DC/DC converter 20 and second DC/DC converter 30 are integrally housed in one casing. In other words, the output side of first DC/DC converter 20 is connected to the input side of second DC/DC converter 30 only via inductance element 40. Accordingly, if the parasitic inductance of power line La between first DC/DC converter 20 and second DC/DC converters 30 is small and inductance element 40 is not provided, a state arises in which a resonant current easily generates.

In contrast, when inductance element 40 is provided in series between first DC/DC converter 20 and second DC/DC converter 30, fluctuations of a current can be suppressed, and thus, the above-mentioned resonant current can be prevented from occurring.

Furthermore, a current flowing into the input side of second DC/DC converter 30 is stabilized, and accordingly, a charging current supplied to low voltage battery B2 can be also stabilized.

As described above, charging device 1 according to the present embodiment makes it possible to control charging currents supplied to high voltage battery B1 and low voltage battery B2, with high precision, so as to make the charging currents constant, respectively.

Note that, although a path through which a resonant current flows can be variously changed in accordance with a circuit configuration of first DC/DC converter 20 and a circuit configuration of second DC/DC converter 30, the provision of inductance element 40 as described above can prevent a resonant current from occurring, regardless of these circuit configurations.

Other Embodiments

The present disclosure is not limited to the above-described embodiments, and various modifications are conceivable.

In the above-described embodiment, a single-phase AC power source is exhibited as an example of external power source S, but, for example, a three-phase AC power source may be used. Furthermore, in the above-described embodiments, external power source S is configured to get connected when charging high voltage battery B1, but may be configured to get connected when charging low voltage battery B2 instead.

In the above-described embodiment, as examples of high voltage battery B1 and low voltage battery B2, a lithium ion secondary battery and a lead storage battery are exhibited, respectively, but, in place of these batteries, any types of batteries, such as a nickel hydrogen secondary battery and an electric double layer capacitor, may be used. Furthermore, high voltage battery B1 and low voltage battery B2 may be the same type of battery, or may be different in type from each other.

In the above-described embodiment, as an example of the circuit configuration of charging device 1, the configuration is exhibited in which high voltage battery B1 and second DC/DC converter 30 are connected in parallel on the output side of first DC/DC converter 20, but, in place of this configuration, a configuration may be applied in which low voltage battery B2 and second DC/DC converter 30 are connected in parallel.

In the above-described embodiment, LLC resonant converter circuit 20 and step-down chopper circuit 30 are exhibited as examples of first DC/DC converter 20 and second DC/DC converter 30, respectively. However, as described above, as each of first DC/DC converter 20 and second DC/DC converter 30, any voltage-conversion circuit with a switching regulation type may be applied. Note that an LLC resonant converter circuit is configured such that the capacitance of an output capacitor (corresponding to smoothing capacitor 28) of a DC/DC converter is comparatively larger than in other circuit systems, and in particular, a resonant current easily occurs, and hence, the above-mentioned inductance element 40 is particularly effective.

In the above-described embodiment, as an example of the configuration of inductance element 40, an example is exhibited in which inductance element 40 is provided downstream of the branch point to high voltage battery B1 on high side line La. However, inductance element 40 may be provided on low-side line Lb, or may be provided upstream of the branch point to high voltage battery B1 on power La. On the other hand, for example, a changeover switch may be provided in parallel with inductance element 40 so as to bypass inductance element 40 in accordance with an operating state of second DC/DC converter 30.

Hereinbefore, specific examples of the present disclosure are described in detail, but these are merely exemplifications, and the claims are not limited to these examples. Technologies described in the claims also include variations and modifications of the above-described specific examples.

The charging device according to the present disclosure is capable of reducing fluctuations of a charging current to be supplied to each of the high voltage battery and the low voltage battery.

What is claimed is:

1. A charging device configured to charge a first battery using alternating current (AC) power supplied from an external power source, and capable of charging a second battery using the AC power, the first battery and the second battery having different charge voltages, the charging device comprising:
    an AC/DC converter connected to the external power source, the AC/DC converter being configured to convert the AC power into first direct current (DC) power;
    a first DC/DC converter including an output capacitor, the first DC/DC converter being configured to convert a voltage of the first DC power outputted from the AC/DC converter to generate second DC power and supply the second DC power to the first battery;
    a second DC/DC converter including an input capacitor, the second DC/DC converter being connected in parallel to the first battery on an output side of the first DC/DC converter, the second DC/DC converter being configured to convert a voltage of the second DC power outputted from the first DC/DC converter to generate third DC power and supply the third DC power to the second battery; and
    an inductance element provided between the output capacitor of the first DC/DC converter and the input capacitor of the second DC/DC converter and connected in series to the first DC/DC converter and the second DC/DC converter,
    wherein the inductance element is disposed between the first battery and the second battery.

2. The charging device according to claim 1, wherein the first DC/DC converter further includes a first switching driver and the second DC/DC converter further includes a second switching driver.

3. The charging device according to claim 2, wherein the first DC/DC converter further includes a transformer,
in the first DC/DC converter, the output capacitor is closer to the second DC/DC converter than the transformer is, and
in the second DC/DC converter, the input capacitor is closer to the first DC/DC converter than the second switching driver.

4. The charging device according to claim 3, wherein the first DC/DC converter includes an LLC resonant converter circuit.

5. The charging device according to claim 4, wherein the AC/DC converter, the first DC/DC converter, the second DC/DC converter, and the inductance element are integrally housed in an identical casing.

6. The charging device according to claim 5, wherein the output side of the first DC/DC converter is connected to an input side of the second DC/DC converter only via the inductance element.

7. The charging device according to claim 3, wherein the AC/DC converter, the first DC/DC converter, the second DC/DC converter, and the inductance element are integrally housed in an identical casing.

8. The charging device according to claim 7, wherein the output side of the first DC/DC converter is connected to an input side of the second DC/DC converter only via the inductance element.

9. The charging device according to claim 3, wherein the output side of the first DC/DC converter is connected to an input side of the second DC/DC converter only via the inductance element.

10. The charging device according to claim 1, wherein the second DC power is higher in voltage than the third DC power.

11. The charging device according to claim 1, wherein the first DC/DC converter includes an LLC resonant converter circuit.

12. The charging device according to claim 11, wherein the AC/DC converter, the first DC/DC converter, the second DC/DC converter, and the inductance element are integrally housed in an identical casing.

13. The charging device according to claim 12, wherein the output side of the first DC/DC converter is connected to an input side of the second DC/DC converter only via the inductance element.

14. The charging device according to claim 11, wherein the output side of the first DC/DC converter is connected to an input side of the second DC/DC converter only via the inductance element.

15. The charging device according to claim 1, wherein the second DC/DC converter includes a step-down chopper circuit.

16. The charging device according to claim 1, wherein the AC/DC converter, the first DC/DC converter, the second DC/DC converter, and the inductance element are integrally housed in an identical casing.

17. The charging device according to claim 16, wherein the output side of the first DC/DC converter is connected to an input side of the second DC/DC converter only via the inductance element.

18. The charging device according to claim 1, wherein the output side of the first DC/DC converter is connected to an input side of the second DC/DC converter only via the inductance element.

19. An on board power supply device, comprising:
    a charging device according configured to charge a first battery using alternating current (AC) power supplied from an external power source, and capable of charging a second battery using the AC power, the first battery and the second battery having different charge voltages, the charging device including:

an AC/DC converter connected to the external power source, the AC/DC converter being configured to convert the AC power into first direct current (DC) power;

a first DC/DC converter including an output capacitor, the first DC/DC converter being configured to convert a voltage of the first DC power outputted from the AC/DC converter to generate second DC power and supply the second DC power to the first battery;

a second DC/DC converter including an input capacitor, the second DC/DC converter being connected in parallel to the first battery on an output side of the first DC/DC converter, the second DC/DC converter being configured to convert a voltage of the second DC power outputted from the first DC/DC converter to generate third DC power and supply the third DC power to the second battery; and an inductance element provided between the output capacitor of the first DC/DC converter and the input capacitor of the second DC/DC converter and connected in series to the first DC/DC converter and the second DC/DC converter, wherein the inductance element is disposed between the first battery and the second battery, wherein the first battery is connected to the first DC/DC converter on the output side of the first DC/DC converter; and wherein the second battery is connected to the second DC/DC converter on an output side of the second DC/DC converter.

\* \* \* \* \*